June 14, 1938. C. B. WILLIAMS Re. 20,763

WRINGER

Original Filed April 27, 1931 3 Sheets-Sheet 1

Inventor

Charles B. Williams

By Bates, Golrick & Teare

Attorneys

June 14, 1938. C. B. WILLIAMS Re. 20,763
WRINGER
Original Filed April 27, 1931 3 Sheets-Sheet 2
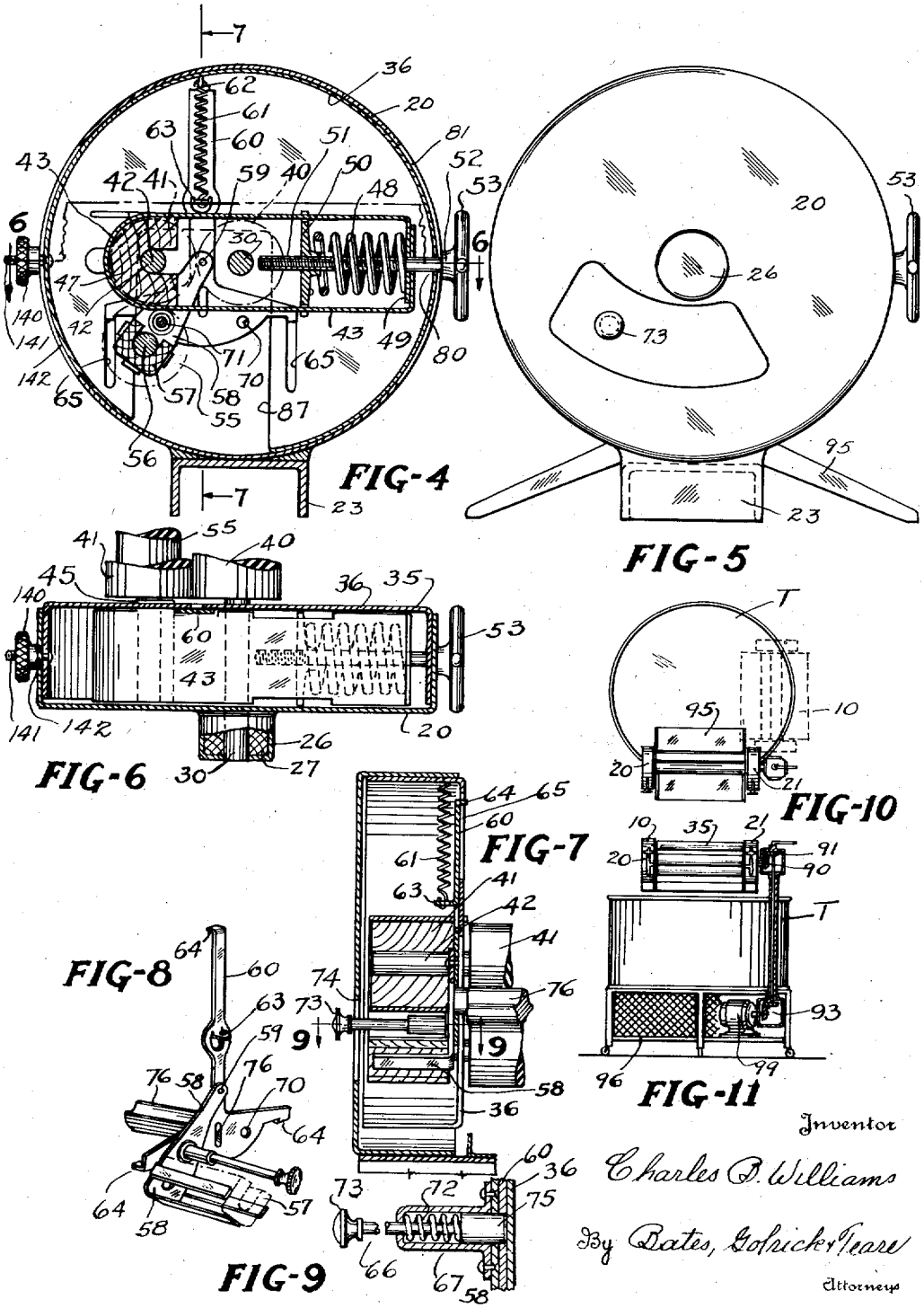
Inventor
Charles B. Williams
By Bates, Gofrick & Teare
Attorneys June 14, 1938. C. B. WILLIAMS Re. 20,763

WRINGER

Original Filed April 27, 1931 3 Sheets-Sheet 3

Inventor

Charles B. Williams

By

Bates, Golrick & Teare

Attorney

Reissued June 14, 1938

Re. 20,763

UNITED STATES PATENT OFFICE 20,763

WRINGER

Charles B. Williams, Shaker Heights, Ohio

Original No. 2,056,105, dated September 29, 1936, Serial No. 533,066, April 27, 1931. Application for reissue July 12, 1937, Serial No. 153.285

38 Claims. (Cl. 68—248)

This invention relates to an improvement in a wringer for laundry purposes, and especially to that type of wringer wherein the material from which the liquid is to be extracted is first fed between a supplemental roll and a pair of pressure rolls and then guided to the bite of the pair of pressure rolls, which coact to squeeze the liquid from the material. Such a wringer is shown in my Patent No. 2,068,524, issued January 19, 1937.

The present application contemplates the provision of a wringer of the type mentioned, wherein one supplemental roll is provided, which supplemental roll may be used in conjunction with either one of the pressure rolls desired, and wherein means common to both pressure rolls is used to guide the material to the bite of the two coacting pressure rolls. This permits the garments to be fed into the wringer from either face thereof, without changing the direction of rotation of the pressure rolls and accomplishes this result with the use of a minimum number of rolls.

Another object is to provide a wringer wherein the fabric may be fed between the supplemental roll and the pressure roll at an angle convenient for the operator, and wherein the fabric will leave the wringer at an angle which insures the falling of the fabric towards the side opposite the operator.

A further object is to provide a wringer with a pair of pressure rolls and a supplemental roll, wherein the rolls may be tilted relative to their transverse axis, so that they may be adjusted to an angle which will conveniently permit the operator to feed the fabric or other material to the rolls.

Other objects of the invention will become apparent from the following description relating to the accompanying drawings, and the essential novel characteristics will be set forth in the claims.

Figure 1:
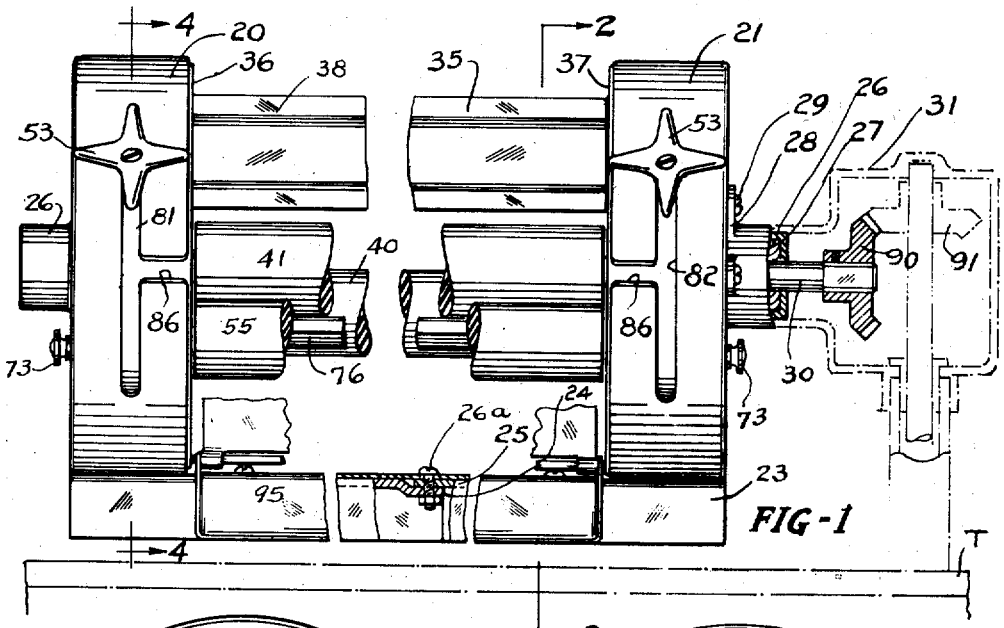
Figure 2:
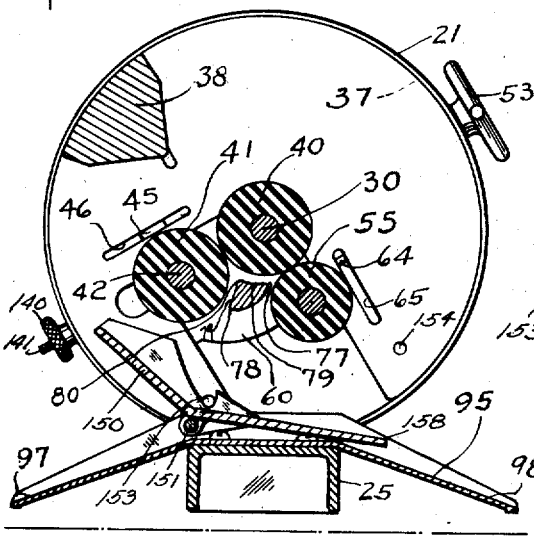
Figure 3:
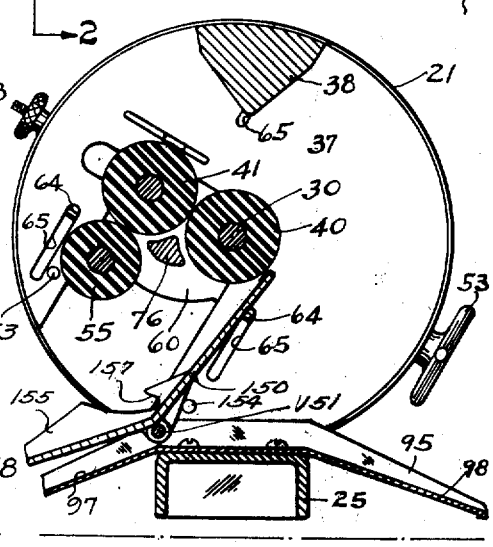
Figure 12:
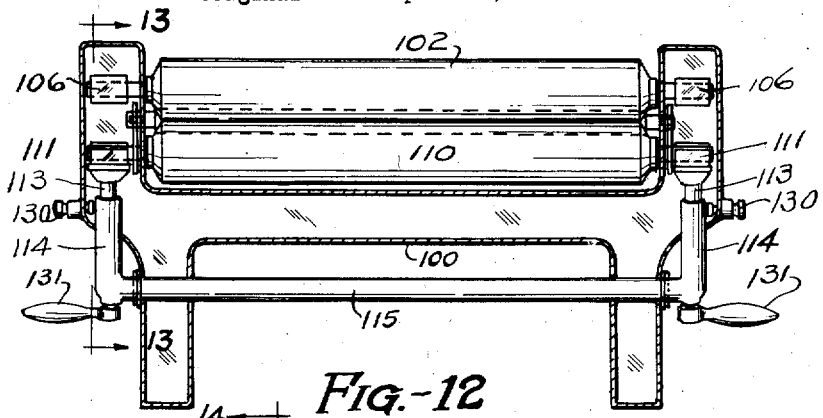
Figure 13:
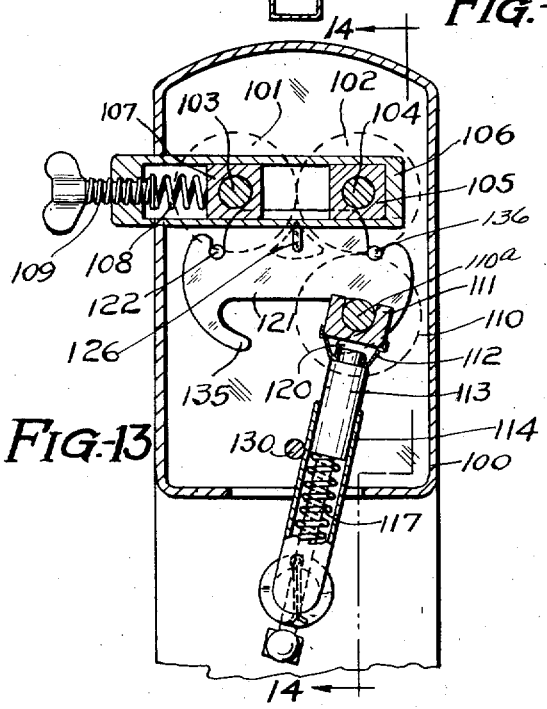
Figure 14:
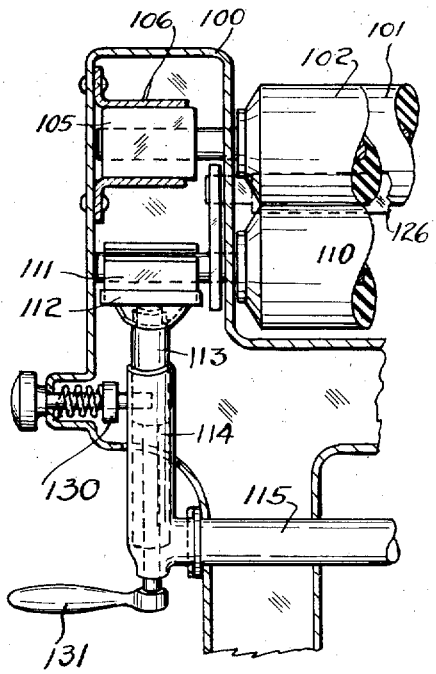
Figure 15:
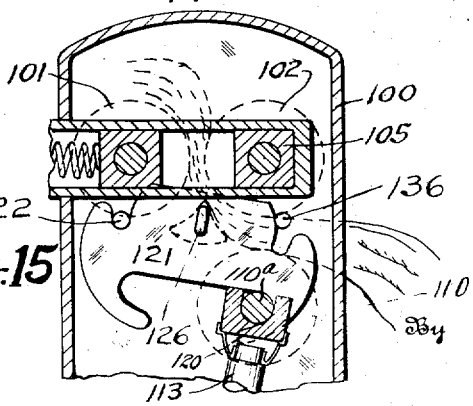

Referring now to the drawings, Fig. 1 is a front elevation of my improved wringer; Fig. 2 is a transverse vertical section, and is indicated by the lines 2—2 on Fig. 1; Fig. 3 is a section taken in the same plane as Fig. 2, but illustrating some of the parts in a slightly different position; Fig. 4 is a vertical transverse section, and is indicated on the lines 4—4 on Fig. 1, the pressure rolls being positioned in a horizontal plane; Fig. 5 is an end elevation of the wringer, the rolls being in a position shown in Fig. 4; Fig. 6 is a horizontal section, and is indicated by the offset lines 6—6 on Fig. 4; Fig. 7 is a vertical section and is indicated by the lines 7—7 on Fig. 4; Fig. 8 is a perspective illustrating the supplemental roll support; Fig. 9 is a sectional detail and is indicated by the lines 9—9 on Fig. 7; Figs. 10 and 11 are a plan and side elevation, respectively, of my wringer, as mounted for use on a standard household washing machine; Fig. 12 is a side elevation, partially in section, of a modified form of wringer; Fig. 13 is a transverse section of the modification shown in Fig. 12, and is indicated by the lines 13—13 on Fig. 12; Fig. 14 is a longitudinal vertical section, as indicated by the lines 14—14 on Fig. 13; Fig. 15 is a section taken in the same plane as Fig. 13, but illustrating the parts in a different operating position.

As shown in Figs. 1 to 11, inclusive, the wringer frame comprises a pair of spaced cylindrical drums 20 and 21, welded or otherwise secured to a channel shaped base member 23. The base 23 is preferably made in two sections 24 and 25, to permit assembly of the wringer and replacement of the wringer rolls. One end of the base section 24 overlies the end of the section 25 and is secured to it by suitable bolts 26a, as shown in Fig. 1. The drums 20 and 21 are provided with outwardly extending hollow bosses 26, adapted to receive suitable bearing blocks 27, which support a pressure roll shaft 30. The construction is such that the axis of the shaft 30 coincides with the axis of the drums. The wringer frame may be secured to the tub in any conventional manner, such as by bolts passing through the base member 23, or, as shown in Fig. 1, by a bracket 28, secured to the drum 21 as by suitable bolts 29, and which bracket forms part of a gear housing 31, which, as shown in Figs. 1, 10 and 11, is secured to the tub T in the usual manner. The inner faces of the drums 20 and 21 are open to permit the assembly of a supplemental frame unit generally indicated at 35.

The supplemental frame 35 comprises a pair of cylindrical drums 36 and 37, adapted to fit within the drums 20 and 21 in such a manner that they may be freely rocked therein. The drums 36 and 37 are spaced by a suitable spacing bar 38, which is preferably welded to the inner faces of the drums. When assembled, the drums 36 and 37 lie entirely within the confines of the drums 20 and 21, and form a closure member for such drums. The supplemental frame 35 in turn supports a second pressure roll, an auxiliary roll, a guide member and a mounting for the last two members.

As heretofore mentioned, my improved wringer is provided with a pair of pressure rolls, one of which 40 is rigidly mounted on the shaft 30, heretofore mentioned as being supported by the outer frame members 20 and 21, and which serves as an axle about which the inner or supplemental frame 35 rocks. The second pressure roll 41 is rigidly mounted on a shaft 42, carried by a pair of brackets 43, one of which is retained in each of the drums 36 and 37 of the supplemental frame. The mounting is such that the pressure roll 41, together with the supplemental frame, may be rocked about the pressure roll 40. The pressure rolls 40 and 41 may comprise the usual rubber wringer rolls, and are rigidly secured to the shafts 30 and 42, respectively.

The brackets 43, which support the pressure roll 41, also house the pressure unit, which resiliently retains the rolls 40 and 41 in contact with each other. These brackets are preferably U-shaped metal members, the legs of the U being bent inwardly at their outermost ends to form a housing, through which the shaft 30 projects. To position the brackets 43 in the supplemental frame, and permit them to move in only one plane, (horizontal in Fig. 4), the brackets are provided with ears or lugs 45 (Figs. 2 and 6) which extend through slotted openings 46 in the drums 36 and 37. Within each bracket 43, and at one end thereof, is a bushing 47 adapted to support the pressure roll shaft 42. At the opposite end of each bracket 43 is a compression spring 48, one end of which abuts the end 49 of the bracket and the other end of which coacts with a spring plate 50, which is slidably mounted in the bracket. The spring plate has a threaded connection with an adjusting screw 51, which extends through the bracket, the outer and inner frame members, and is provided at its outer end with an enlarged portion 52, to prevent the inward movement of the screw when rotated. To permit the pressure of the spring to be readily adjusted, a suitable handle 53 is also secured to the outer end of the adjusting screw. It will be noted that the construction is such that the pressure roll shaft 30 lies between the shaft 42 and the spring. Hence, as the adjusting screw is rotated to increase the pressure on the spring, the ends 54 of the brackets are drawn towards the shaft 30, thereby causing the pressure roll 41 to be drawn into contact with the pressure roll 40.

The wringer is supplied with a supplemental or auxiliary roll 55, which is adapted to coact with either one of the pressure rolls 40 or 41, as desired by the operator. The supplemental roll 55 is supported by and rotates as a unit with the inner or supplemental frame 35. The supplemental roll 55 may be of rubber or other suitable material and is rigidly secured to a shaft 56, which is supported by suitable bearings 57. The bearings 57, carried by arms 58, pivoted as at 59, to bracket members 60, which are slidably mounted in the end frame members 36 and 37. The plane of movement of brackets 60 is normal to the plane of movement of the brackets 43. Each bracket 60 is resiliently held in an uppermost position by a suitable spring 61, one end of which is secured to the bracket as at 63, and the other end is secured to an inwardly extending lug 62 of the frame members 36 or 37, in which the bracket is mounted. To guide the brackets 60 for movement in a plane normal to the movement of the brackets 43, each bracket 60 is preferably T-shaped, and is provided at its ends with suitable lugs 64 adapted to engage slotted openings 65 in its respective inner frame members 36 or 37. The construction is such that the spring 61 normally retains the auxiliary roll 55 in contact with one of the pressure rolls 40 or 41.

The supplemental roll 55 is so mounted that it may be moved to a position substantially beneath either the pressure roll 40 or the pressure roll 41, as desired. As heretofore mentioned, the auxiliary roll 55 is carried by arms 58, which are pivoted at 59, to the anchor brackets 60. As each pivot 59 lies substantially in the line of contact of the two pressure rolls the arms may be swung so that the supplemental roll 55 will underlie either pressure roll desired.

To retain the auxiliary roll in either of its adjusted positions, I prefer to provide a plunger 66, mounted in a housing 67, which is secured to the arm 58. The nose 75 of the plunger 66 is adapted to enter openings 70 and 71 in the anchor plate bracket 60. A suitable compression spring 72 is mounted within the housing 67, and serves to retain the plunger in one of the openings. When it is desired to change the auxiliary roll from one position to the other, it is simply necessary to withdraw the nose 75 of the plunger from the opening 71 by means of a knurled head 73, which extends through slotted openings 74 in the outer frame members, after which the entire unit may be swung to a position beneath the other pressure roll, in which position the nose 75 of the plunger 66 will enter the opening 70.

As shown in the drawings, the rolls 40 and 41 are somewhat larger than the supplemental roll 55. However, I contemplate that they may be made smaller, larger or the same size. Sufficient space, however, must be provided between the three rolls to accommodate a guide member, such as the metal bar 76.

The bar 76 serves to guide the material from the bite of a pressure roll and the supplemental roll, into the bite of the two pressure rolls and prevents such material from becoming wrapped around the supplemental roll. The guide 76 extends the entire length of the rolls and is carried by the brackets 60 in the openings 76a, and therefore travels with the auxiliary rolls. One of the edges 77 or 78 of the guide lies adjacent the supplemental roll 55, depending upon the position of the supplemental roll. From the edges 77 and 78 the guide extends inwardly and upwardly, forming concave surfaces 79, which substantially conform to the contour of the pressure rolls. The faces 79 meet in a common vortex 80, which lies between the two pressure rolls. As the material is progressed through the roll 55, and the coacting pressure roll, one of the faces 79 retains such material in contact with one of the rolls 40 or 41, until the material enters the bite of the two pressure rolls.

As shown in Fig. 4, the pressure rolls 40 and 41 are in a substantially horizontal plane, while the supplementary roll 55 is in a position substantially directly beneath the pressure roll 41. In this instance, material is fed to the bite of the supplemental roll 55 and the roll 41 in substantially a horizontal plane. It is sometimes more convenient for the operator to feed the material to the rolls in a plane which is tilted from the horizontal. This is accomplished by rotating the supplemental frame 35 about the axis of the roll 40, thus moving the plane passing through the rolls 41 and 55 from a vertical to a tilted position, to more readily facilitate the entrance of garments therebetween. It is desirable that this swinging movement be such that the angle at which material is fed to the rolls may be varied to suit the requirements of the operator. In Fig. 3 I have shown the rolls swung or tilted in a clockwise direction with the supplemental roll in contact with the pressure roll 41. It will be noted that the plane which passes through the supplemental roll 55 and its associated pressure roll 41 is inclined from the vertical, thereby permitting the garments to be readily fed between the two rolls in a direction of the arrows thereon indicated. In Fig. 2 I show the supplemental roll 55 in a position to coact with the pressure roll 40, in which instance the garments are fed between such rolls. In this figure it will be noted that the supplemental frame has been swung in a counterclockwise direction, permitting the garments to be fed from the direction indicated by the arrows on that figure.

As heretofore mentioned, the supplemental frame, together with the pressure roll 41, the guide 76, and the supplemental roll 55, are swingable as a unit about the axis of the pressure roll 40. The construction is such that the supplemental frame 35 may be locked in any desired position, relative to the main frame, by means of the adjusting screws 51 heretofore mentioned. It will be noted that such adjusting screws pass through a circular opening 80 in the drums 36 and 37 of the supplemental frame, and through slotted openings 81 and 82 in the drums 20 and 21, respectively.

The drums of the main frame are clamped to the drums of the supplemental frame by tightening knurled headed adjusting nuts 140 on threaded studs 141. The studs 141 are riveted or otherwise secured to the supplemental frame drums 36 and 37 and pass through slotted openings 142 in the outer drums 20 and 21. The clamping members 140 are of such diameter that they act against the periphery of the drums 20 and 21 adjacent the openings 142 and clamp the drums together. This locking action is supplemented by the reaction of the heads 52 of the adjusting screws 51, the latter acting in substantially the same manner as the clamping members 140. It will be noted that the supplemental frame may be clamped in any desired position within the range of the slots 81, 82 and 142. While I have shown these slots encircling approximately 90 degrees of the circumference of the main frame drums 20 and 21, I contemplate making it so that the supplemental frame may be swung a greater degree. However, I find that for most practical purposes that arc length shown is sufficient.

The wringer is so constructed that it may be readily dismantled, so as to replace the rolls. To this end the bolts 26a are removed from the base members 24 and 25, and by separating the two members the drums 20 and 21 may be withdrawn from the supplemental frame which previously has been rotated to a position where the adjusting screws 51 may readily be withdrawn from the main frame through the transverse slots 86, which communicate with the slots 81 and 82. The brackets 43 and 60 may then be released from the supplemental frame and removed, and the rolls are then dropped down through openings 87, which extend through the base and periphery of the supplemental frame drums 36 and 37.

Power may be supplied to the wringer in any suitable manner. However, it is to be noted that my wringer is especially adapted for use in power-driven mechanism, in which case the housing 31, which may secure the wringer to the washing machine or tub T, preferably contains a pair of bevelled gears 90 and 91, the former being rigidly secured to the roll shaft 30 and the latter to a vertical shaft 92, which is driven through suitable gearing 93 by a motor 99, which is secured to the base 96 of the machine. If desired, the wringer may be attached to the tub by means of a base 23 and a suitable hand crank affixed to the shaft 30, and the rolls manually rotated.

A suitable drain board is provided which, as shown in the drawings, comprises a flat member 95. The board is rigidly mounted on the base member 23 of the wringer and is provided with a pair of downwardly extending surfaces 97 and 98, which extend into either side of the wringer adjacent the base thereof.

The drain board 95 is provided with a flapper board 150, which is pivotally connected thereto, as at 151, and is tiltable toward either side of the wringer, depending upon which side of the wringer the material is being fed. This tilting movement is accomplished by a pair of pins 153 and 154, which are secured to and project from the inner drums 36 and 37. The pin 153 contacts with a cam faced upturned flange 155 of the flapper board. The pin 154 contacts with the bottom surface of the flapper board, at the opposite side of its pivot. When the supplemental frame is swung from position shown in Fig. 2, to the position shown in Fig. 3, the weighted end 156 of the flapper board causes the latter to swing, while remaining in contact with the pin 154. This movement of the frame member 36 causes the pin 153 to engage a notch 157 in the flange 155 and a continued movement of the supplemental frame draws the pin 154 out from the path of the flapper board, which is retained and locked in position by the pin 153. When the flapper board is swung in the opposite direction, the pin 153 acts on the flange 155 and cams the flapper board 150 counter-clockwise. This cam is so arranged that the pin 153 will bring the outer edge of the wing 158 above the pin 154. Further rotation of the supplemental frame then brings the pin 154 into a position below the flapper board and causes it to act against the lower surface of the board and cam it to its tilted position, retaining it there until the supplemental frame 35 is again swung in the opposite direction.

In Figs. 12 to 15, I illustrate a modified form of wringer, wherein the pressure rolls permanently lie in a horizontal plane. However, I show in this modification means whereby one supplemental roll may be used with either of the pressure rolls, as desired. As shown in Figs. 12 to 15, inclusive, 100 indicates a wringer frame of a usual type, adapted to house a pair of pressure rolls 101 and 102, which are rigidly mounted on shafts 103 and 104, respectively. The shaft 104 is carried in bearing blocks 105, mounted in guide members 106, while the shaft 103 is mounted in bearing blocks 107, against which pressure springs 108 are urged by adjusting screws 109. The construction is such that the two rolls are resiliently urged into contact with each other.

In this modification, the supplemental roll 110 is carried by a shaft 110a, which is shown as mounted in bearing members 111, carried by spring cups 112. The cups 112 are supported on plungers 113, mounted in hollow sleeve members 114. The sleeves 114 are secured to opposite ends of a pivot bar 115, which is rotatively mounted in the frame 100. Suitable compression springs 117, mounted in the sleeves 114, normally urge the plungers upwardly, thereby acting to maintain the auxiliary roll 110 in contact with one of the pressure rolls 101 or 102.

When the rolls are in a normal or inactive position, the supplementary roll shaft 110a is engaged by a hook 120 of an anchor plate 121. As the material is fed between the roll 110 and the roll 102, the two are separated, causing the shaft 110a to rock the plate 121 about a pivot pin 122, which is secured to the frame member 100. The material, upon passing between these two rolls, is maintained in contact with the pressure roll 102 by means of a triangular shaped guide 126, which is similar in all respects to the guide 76, heretofore described. The guide 126 is carried by the anchor plate 121, hence it follows the supplemental roll and serves at all times to strip the material therefrom.

Large apertures or openings are provided on the inner sides of end frames 100 to allow the guide 126 and roll 110 to move freely substantially universally as clothes pass through the wringer. This permits the unit 110 and 126 and supports therefor to assume positions varying from that of Fig. 13 to that shown in Fig. 15.

When it is desired to use the supplemental roll in conjunction with the pressure roll 101, to feed material from the opposite face of the wringer, the operator withdraws a spring pressed plunger 130 carried by the frame 100, which normally serves to retain the supplemental roll in the position shown in Fig. 13, and by means of a handle 131 which is secured to the plungers 113, the operator swings the plunger counter-clockwise until the shaft 110a engages a hook 135 of the plate 121, which hook corresponds to the aforementioned hook 120. The operator then releases the plunger 130 and the latter serves to retain the supplemental roll 110 in contact with the pressure roll 101. In this instance, when the material is fed between the supplemental roll 110 and the pressure roll 101, the anchor plate 121 rocks about a pivot pin 136 and the action of the guide 126 is substantially the same as described in connection with the pressure roll 102.

From the foregoing description, it is evident that I have provided a wringer of the type having a pair of pressure rolls with a supplemental roll, which is adapted to be positioned to coact with either one of the pressure rolls, as desired, so that material may be fed between the supplemental roll and either one of the pressure rolls, as desired, thereby permitting material to be fed to the rolls from either side of the wringer. I have also provided a simple adjustment for said supplemental roll so that it may be readily changed from a position where it coacts with one pressure roll to a position where it coacts with the other pressure roll. I have also provided a wringer which has a pair of pressure rolls which normally extend in a horizontal plane, and a supplemental roll coacting with one of the pressure rolls substantially in a plane normal to the plane of the pressure rolls, wherein the plane passing through the supplemental roll and its coacting pressure roll may be swung from the vertical about the axis of one of the pressure rolls, thereby permitting the operator to feed garments or other material to the rolls in a convenient plane and causing the material progressed from the pressure rolls to fall to the opposite side of the wringer from which it was fed.

I claim:

1. In a wringer, a main frame, a supplemental frame adjustably carried by the main frame, a pressure roll rotatably supported by the main frame, a second pressure roll adapted to coact with the first named roll and rotatably mounted in the supplemental frame, pressure means carried by the supplemental frame and adapted to resiliently urge the two rolls into contact with each other, a supplemental roll carried by the supplemental frame and arranged to contact with one of the pressure rolls and wherein the supplemental frame together with the supplemental roll and second named pressure roll are shiftable as a unit about the first-named pressure roll, without disturbing the contact between the two rolls.

2. In a wringer, a main frame, a supplemental frame rotatably carried by the main frame, a pressure roll rotatably supported by one of said frames, a second pressure roll adapted to coact with the first named roll and rotatably mounted in the other of said frames, pressure means adapted to resiliently urge the two rolls into contact with each other, a supplemental roll adjustably carried by one of said frames and arranged to coact with either pressure roll as desired, and wherein one of said frames together with its associated roll are bodily rotatable relative to the other frame and in a concentric circle about the axis of the other roll.

3. In a wringer, a main frame comprising a pair of open ended drums, means adapted to space said drums, a supplemental frame comprising a second pair of spaced drums telescopically carried by the first named drums, means adapted to space the second named drums, a pair of coacting pressure rolls rotatably supported by said frames, the axis of one of said rolls lying along the axis of said frames, wherein the supplemental frame and one of said rolls are rotatable as a unit about the axis of the main frame.

4. In a wringer, a main frame comprising a pair of open ended spaced drums, a supplemental frame comprising a second pair of spaced drums carried by the main frame, a pressure roll rotatably supported by the main frame the axis of such roll lying along the axis of the first-named drums, a second pressure roll rotatably supported in the supplemental frame and adapted to coact with the first named roll, and wherein the supplemental frame and second named roll may be swung as a unit about the axis of the first named roll.

5. In a wringer, the combination of a frame, a pair of pressure rolls, resilient means adapted to retain the pressure rolls in contact with each other, a supplemental roll carried by the frame, said supplemental roll adapted to be positioned to coact with either one of said pressure rolls desired, resilient means adapted to retain the supplemental roll in contact with its coacting pressure roll, a guide member disposed between the three rolls, wherein the work may be fed from either side of the frame between one pressure roll and the supplemental roll, and thereafter guided into the bite of the two pressure rolls, and means whereby one of said pressure rolls, the supplemental roll and the guide may be rotated bodily about the axis of the other pressure roll.

6. In a wringer, the combination of a frame, a pair of pressure rolls mounted in said frame, resilient means adapted to retain the pressure rolls in contact with each other, a supplemental roll adapted to be positioned to coact with either one of said pressure rolls as desired, resilient means adapted to retain the supplemental roll in contact with either one of said pressure rolls, a guide member disposed between the three rolls, and wherein the work may be fed from either side of the frame between one pressure roll and the supplemental roll and thereafter guided into the pass of the two pressure rolls.

7. In a wringer, the combination of a pair of pressure rolls, a supplemental roll adapted to coact with either one of said pressure rolls desired, a guide in the form of a ridge projecting toward the pass of the pressure rolls, a pair of brackets supporting the guide and carrying the journals for the supplemental roll, springs adapted to support the brackets, whereby the supplemental roll and the guide may be moved as a unit, and wherein the supplemental roll may be moved relative to the guide from a position coacting with one pressure roll to a position coacting with the other pressure roll.

8. In a wringer, a pair of pressure rolls adapted to coact to squeeze moisture from the work, a supplemental roll, said supplemental roll adapted to coact with either one of the pressure rolls to receive the work, a guide associated with said supplemental roll adapted to guide the work from the pass of the supplemental roll and the coacting pressure roll into the pass of the two pressure rolls, and wherein the guide occupies substantially the same position relative to the supplemental roll and its coacting pressure roll regardless of which pressure roll the supplemental roll coacts with.

9. In a wringer, a pair of pressure rolls, resilient means adapted to retain the pressure rolls in contact with each other, a supplemental roll adapted to coact with one of said pressure rolls, said supplemental roll being pivotally carried whereby the supplemental roll may be rocked to coact with either one of said pressure rolls desired, and releasable means to retain the supplemental roll in a position coacting with the desired pressure roll.

10. In a wringer, the combination of a pair of pressure rolls, a supplemental roll adapted to contact with either one of said pressure rolls as desired, means to retain the supplemental roll in position substantially beneath the desired pressure roll, a guide adjacent said supplemental roll and the pressure rolls, said guide having a concaved surface substantially parallel with each of the pressure rolls, means connecting the guide and the supplemental rolls and yieldingly supporting them so that the guide and supplemental rolls may move bodily away from the coacting pressure roll.

11. In a wringer, the combination of a frame, a pair of pressure rolls mounted in the frame, resilient means adapted to retain the pressure rolls in contact with each other, an auxiliary roll mounted in the frame, said auxiliary roll being adapted to be positioned to coact with either one of said pressure rolls as desired, and resilient means adapted to retain the auxiliary roll in contact with either of said pressure rolls.

12. In a wringer, the combination of a pair of pressure rolls, a supplemental roll adapted to lie beneath and coact with either one of said pressure rolls desired, a guide in the form of a ridge projecting upward toward the pass of the pressure rolls, said supplemental roll adapted to be moved from a position beneath one pressure roll to a position beneath the other pressure roll, and wherein said guide coacts with the supplemental roll in either of its adjusted positions to strip the work therefrom.

13. In a wringer, the combination of a pair of pressure rolls, an auxiliary roll adapted to coact with either one of said pressure rolls desired, a guide in the form of a ridge projecting toward the pass of the pressure rolls, a pair of bearing blocks supporting the guide and carrying the journals for the auxiliary roll, a spring adapted to support the bearing block, whereby the auxiliary roll and the guide may be moved as a unit, the auxiliary roll adapted to be moved relative to the guide, from a position in contact with one pressure roll to a position in contact with the other pressure roll, and wherein the supplemental roll and the guide may move bodily in a plane substantially normal to the plane of movement of the pressure rolls.

14. In a wringer, the combination of a main frame, a supplemental frame, a pressure roll rotatably mounted in the main frame, a second pressure roll rotatably mounted in the supplemental frame, resilient means carried by the supplemental frame and adapted to retain the pressure rolls in contact with each other, bracket members mounted in the supplemental frame, a guide member carried by said brackets, resilient means adapted to retain the guide member and the bracket in a position adjacent the two pressure rolls, pivoted arms carried by said brackets, bearings associated with said arms and adapted to support the supplemental roll, wherein said supplemental roll may be swung to coact with either one of said pressure rolls desired, said second named resilient means adapted to retain the supplemental roll in contact with one of the pressure rolls, means adapted to secure said arms in an adjusted position relative to said brackets, said supplemental roll and guide member being movable as a unit in a plane substantially normal to a plane passing through the axis of one of the pressure rolls, and wherein said supplemental frame and its associated parts may be rotated relative to said main frame.

15. In a wringer, the combination of a main frame, a supplemental frame rotatably mounted in the main frame, a pressure roll rotatably mounted in the main frame, a second pressure roll rotatably mounted in the supplemental frame, resilient means carried by one of said frames and adapted to retain the pressure rolls in contact with each other, bracket members mounted in the supplemental frame, a guide member carried by said brackets, resilient means adapted to retain the guide member and the bracket in a position adjacent the two pressure rolls, pivoted arms carried by said brackets, bearings carried by said arms adapted to support the supplemental roll whereby the supplemental roll may be swung to coact with either of said pressure rolls desired, said second named resilient means being adapted to retain the supplemental roll in contact with one of the pressure rolls, and means adapted to secure said arms in an adjusted position relative to said brackets, wherein said supplemental roll and guide member move as a unit with the supplemental frame and one of the pressure rolls, and a clamp including the first named resilient means to clamp the supplemental frame in an adjusted position relative to the main frame.

16. In a wringer, the combination with a pair of coacting pressure rolls adapted to receive material between them to have liquid squeezed therefrom, a supplemental roll adapted to coact with one of said pressure rolls to receive the material before it reaches the bite of the two pressure rolls and means whereby one of said pressure rolls and said supplemental roll may be swung about the axis of the other roll.

17. In a wringer, the combination with a pair of coacting pressure rolls, means whereby one of said rolls may be swung about the axis of the other roll to change the location of the contact between the rolls, and a supplemental roll shiftable to contact with either of said pressure rolls as desired.

18. In a wringer, a main frame, a supplemental frame rotatably mounted in the main frame, a pressure roll rotatably mounted in the main frame and in axial alignment with both of said frames, a second pressure roll rotatably and slidably mounted in the supplemental frame, resilient means carried by one of said frames to maintain said second named pressure roll in contact with the first named pressure roll, a supplemental roll rotatably carried in the supplemental frame, resilient means carried by one of said frames to maintain the supplemental roll in contact with one of said pressure rolls, wherein the supplemental frame, together with the two rolls carried thereby, may be rotated relative to the main frame without disturbing the relative relationship of the axes of the three rolls.

19. In a wringer, the combination of a stationary frame having a pair of upright end members spaced apart, a supplemental frame mounted between the upright members and pivotally carried thereby to turn on an axis connecting such end members, a pressure roll and an auxiliary roll both carried by the last-mentioned frame and adapted to occupy various actual positions while preserving their relation one to the other, and a second pressure roll adapted to coact with the pressure roll first mentioned.

20. In a wringer, the combination of a stationary frame, having a base portion and a pair of upright end members spaced apart, a frame mounted between the upright end members and pivotally carried thereby to turn on an axis connecting such end members, a pressure roll and an auxiliary roll both carried by the last-mentioned frame and adapted to occupy various actual positions for preserving their relation one to the other, a second pressure roll, spring means for causing pressure between the second-named pressure roll and the first-named pressure roll, and means for locking the last-mentioned frame in a plurality of positions relative to the first-mentioned frame.

21. In a wringer, a main frame, a supplemental frame movably mounted on the main frame, a wringer roll carried by one of said frames, a pair of wringer rolls carried by the other of said frames, each of said rolls arranged to contact with another roll in a series relationship, and wherein relative movement between the frames will change the position of the rolls relative to one of said frames without disturbing the position of the rolls relative to each other.

22. In a wringer, the combination of a frame, a pair of pressure rolls mounted in the frame, resilient means adapted to retain the pressure rolls in contact with each other, a guide disposed beneath the pressure rolls, an auxiliary roll mounted in the frame, said auxiliary roll being adapted to be moved from one side of the guide to the other side thereof and coact with one of said pressure rolls when on one side of the guide and with the other pressure roll when on the other side of the guide.

23. In combination with a washing machine having a tub and a support therefor, a column rising upwardly from said support, a wringer mounted on the upper end of said column and arranged to swing in a horizontal plane through an angle of ninety degrees from one edge of the tub to another edge thereof whereby material from said tub will be presented to one face of the wringer when in one position and to the opposite face when the wringer is in the other position, said wringer comprising a pair of pressure rolls disposed in a substantially horizontal plane, a supplemental roll arranged to be moved beneath one pressure roll when the wringer is in one position relative to the tub and beneath the other pressure roll when the wringer is in the other position, whereby the material is first fed between said supplemental roll and one of said pressure rolls and then between the two pressure rolls, and a common power means for said washer and said wringer.

24. In a wringer, a pair of coacting pressure rolls to extract liquid from material fed therebetween, an auxiliary roll, means to cause the auxiliary roll to coact with either pressure roll to provide a bite between the auxiliary roll and the coacting pressure roll, whereby the clothes are fed into the bite of the auxiliary roll and its coacting pressure roll, and then through the bite of the pressure rolls, and a guide coacting with a pair of rolls to guide material into the bite of such pair of rolls.

25. In a wringer, a frame, a pair of coacting pressure rolls mounted in said frame, means movable to coact with one pressure roll or with the other as desired, to guide clothes into the bite of said pressure rolls, a drain board adapted to drain liquid to either side of said wringer, and means to shift said movable means and said drain board simultaneously.

26. In a wringer, a pair of pressure rolls, an auxiliary roll, means to resiliently urge said auxiliary roll toward a pressure roll to provide a bite therewith, and means to effect a relative bodily shifting between the auxiliary roll and the pair of pressure rolls, to cause the auxiliary roll selectively to coact with either one of the pressure rolls desired.

27. In a wringer, a pair of pressure rolls, an auxiliary roll, means to resiliently urge said auxiliary roll toward a pressure roll to provide a bite therewith, and means to effect a relatively bodily shifting between the auxiliary roll and a pair of pressure rolls to cause the auxiliary roll selectively to coact with either one of the pressure rolls desired, a drain board to selectively divert liquid wrung from material passing through the wringer to either of two opposite directions, and means whereby said shifting means controls the direction of diversion.

28. In a wringer, a frame, a pair of coacting pressure rolls mounted in said frame and a common means shiftable substantially parallel to a plane through the roll axes to assume a coacting position with one roll at a time to guide material between said means and the coacting pressure roll into the bite of the two pressure rolls.

29. In a wringer of the type adapted to receive clothes from either side and pass them through an intake bite and then through an upwardly opening pressure bite, a frame, three rolls in said frame adapted to coact to provide a pair of roll bites, and shiftable mechanism including resilient means to establish an intake bite at either side of the wringer between two of said rolls at a time.

30. In a wringer, a frame, three rolls in said frame with a common support for a pair of said rolls, and shiftable mechanism adapted to be alternatively positioned to establish resilient pressure between the third roll and either one of said common supported rolls as desired to provide a material gripping clothes bite.

31. In a wringer, a frame, three rolls in said frame with a pair of said rolls disposed in a substantially horizontal plane and shiftable mechanism adapted to be alternatively positioned to establish resilient pressure between the third roll and either one of said horizontal rolls as desired to provide a material gripping clothes bite.

32. In a wringer, a frame, three rolls in said frame with a pair of said rolls disposed in a substantially horizontal plane and shiftable mechanism adapted to be alternatively positioned to establish resilient pressure between the third roll and either one of said horizontal rolls as desired to provide a material gripping clothes bite, comprising a member pivotally mounted with respect to said frame, a second member and a spring interposed between said two members and active through them to apply said resilient pressure.

33. In a three roll wringer, a frame, three rolls carried thereby, means to establish between said rolls a downwardly opening auxiliary intake bite and an upwardly discharging pressure bite at opposite sides of the wringer and mechanism to shift said means to reverse the relative location of said auxiliary bite and said pressure bite to permit the operator to feed clothes to the wringer from either side thereof.

34. A wringer to which clothes may be fed from either side comprising a frame, a roll rotatably carried thereby, a pair of rolls each coacting with the first roll and lying therebelow in a plane more nearly horizontal than vertical, resilient means acting between one of the lower rolls and the top roll to establish an intake bite, resilient pressure means acting between said other lower roll and the top roll to establish a pressure bite and means to shift the rolls to permit the operator to feed clothes in the same sequence from the other side of the wringer.

35. In a wringer, a frame, three rolls carried by said frame, means to maintain a resilient light pressure intake bite between one roll and a second roll, means to maintain a resilient clothes wringing bite between one of said rolls forming said intake bite and the third roll, means to shift said light pressure maintaining means to maintain a resilient light pressure intake bite between said one roll and the third roll, said second means simultaneously maintaining a resilient clothes wringing bite between one of said rolls forming said new intake bite and the second roll.

36. In a multiple roll clothes wringer, a frame, three rolls carried in said frame, means to establish a clothes wringing pressure bite and an auxiliary light pressure intake bite between respective pairs of said rolls, cooperating mechanism to reverse the location of said bites with respect to the frame to permit feeding clothes through said wringer from either side and a shift member to actuate said cooperating mechanism.

37. In a three roll clothes wringer, a frame, means to establish an upwardly discharging clothes wringing pressure bite between certain rolls, means to establish an auxiliary light pressure intake bite between one of said certain rolls and the third roll, and mechanism to simultaneously reverse the relative location of said wringing bite and said auxiliary bite with respect to the frame to permit the discharge of the clothes in an upward direction at either side of the wringer desired.

38. In a wringer to which clothes may be fed from either side, a frame, three rolls therein, means to establish a clothes gripping intake bite between one pair of said rolls, shiftable mechanism including resilient means to establish a clothes wringing bite between another pair of said rolls to feed clothes through said wringer in one direction first through the intake bite and then through the pressure bite, said shiftable mechanism adapted to be shifted with respect to the frame to reverse the relative location of said bites and re-position said resilient means to maintain a wringing bite discharging at the opposite side of the wringer from said first direction of discharge.

CHARLES B. WILLIAMS.